United States Patent
Jenkins et al.

(12) 
(10) Patent No.: US 6,497,036 B1
(45) Date of Patent: Dec. 24, 2002

(54) TOP COVER INSTALLATION STATION FOR A DISC DRIVE

(75) Inventors: James R. Jenkins, Yukon, OK (US); Roger A. Jessen, Norman, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 186 days.

(21) Appl. No.: 09/641,694

(22) Filed: Aug. 18, 2000

Related U.S. Application Data (60) Provisional application No. 60/150,139, filed on Aug. 20, 1999.

(51) Int. Cl.[7] ................................................ B23P 19/00
(52) U.S. Cl. .............................. 29/737; 29/783; 29/787; 29/795; 29/809
(58) Field of Search ......................... 29/737, 783, 787, 29/795, 809

(56) References Cited

U.S. PATENT DOCUMENTS

| | | | |
|---|---|---|---|
| 3,021,882 A | | 2/1962 | Knoll et al. |
| 3,107,707 A | | 10/1963 | Berg |
| 4,725,904 A | * | 2/1988 | Dalziel .................... 360/264.6 |
| 4,817,275 A | | 4/1989 | Van Berkel |
| 4,862,584 A | * | 9/1989 | Budy et al. .................... 29/737 |
| 4,922,436 A | | 5/1990 | Dohm et al. |
| 5,309,628 A | * | 5/1994 | Fukuchi et al. ................ 29/737 |
| 5,404,636 A | | 4/1995 | Stefansky et al. |
| 5,454,157 A | | 10/1995 | Ananth et al. |
| 5,613,292 A | * | 3/1997 | Bennett et al. ................ 29/737 |
| 5,771,553 A | | 6/1998 | Sim et al. |
| 5,987,735 A | | 11/1999 | Horning et al. |

* cited by examiner

Primary Examiner—David P. Bryant
(74) Attorney, Agent, or Firm—Fellers, Snider, et al.

(57) ABSTRACT

A top cover installation station with a feeder assembly and a robotic assembly for installing a top cover with top cover fasteners on a basedeck of a disc drive. The feeder assembly supports top cover wireframe caddies, each caddy containing top covers. A dial assembly transports each caddy into alignment with an elevator assembly that aligns the top cover with an escapement assembly that removes the top cover from the caddy. The robotic assembly has a positioning assembly supporting a pair of Z-axis end effector assemblies, the positioning assembly transporting the pair of effector assemblies to predetermined positions. A first end effector assembly picks and places the top cover adjacent the basedeck and a second end effector assembly grips and secures the top cover onto the basedeck via the top cover fasteners.

9 Claims, 7 Drawing Sheets

TOP COVER INSTALLATION STATION FOR A DISC DRIVE

RELATED APPLICATIONS

This application claims priority to U.S. Provisional Application No. 60/150,139 filed Aug. 20, 1999.

FIELD OF THE INVENTION

The present invention relates generally to the field of disc drive data storage devices, and more particularly, but not by way of limitation, to an automated assembly of a disc drive head-disc assembly which includes an automated top cover installation station for installing top covers on disc drives.

BACKGROUND

Modern hard disc drives are commonly used in a multitude of computer environments ranging from super computers through notebook computers to store large amounts of data in a form that can be made readily available to a user. Typically, a disc drive comprises one or more magnetic discs that are rotated by a spindle motor at a constant high speed. The surface of each disc serves as a data recording surface and is divided into a series of generally concentric recording tracks radially spaced across a band between an inner diameter and an outer diameter. The data tracks extend around the disc and data is stored within the tracks on the disc surface in the form of magnetic flux transitions. The flux transitions are induced by an array of transducers otherwise commonly called read/write heads. Typically, each data track is divided into a number of data sectors that store fixed sized data blocks.

Each read/write head includes an interactive element such as a magnetic transducer which senses the magnetic transitions on a selected data track to read the data stored on the track. Alternatively, the read/write head transmits an electrical signal that induces magnetic transitions on the selected data track to write data to the track. As is known in the art, the read/write heads are supported by rotary actuator arms and are positioned by the actuator arms over a selected data track to either read or write data. The read/write head includes a slider assembly having an air-bearing surface that causes the read/write head to fly relative to the disc surface. The air bearing is developed by load forces applied to the read/write head by a load arm interacting with air currents produced by disc rotation.

Typically, several open-centered discs and spacer rings are alternately stacked on the hub of a spindle motor, followed by the attachment of a clampring to form a disc pack. The hub, defining the core of the stack, serves to align the discs and spacer rings around a common centerline. Movement of the discs and spacer rings is typically constrained by a compressive load maintained by the clampring. The complementary actuator arms of an actuator assembly, commonly called an E block, support the read/write heads to access the surfaces of the stacked discs of the disc pack. The read/write heads communicate electronically with a printed circuit board assembly (PCB) through read/write wires and a flex circuit attached to the E-block. When the E-block is merged with the disc pack into a base deck and a cover is attached to the base deck, a head-disc assembly (HDA) is formed. For a general discussion of E-block assembly techniques, see U.S. Pat. No. 5,404,636 issued to Stefansky et al. and assigned to the assignee of the present invention.

The head-disc assembly (HDA) of a disc drive is typically assembled in a clean room environment. A clean room environment (free of contaminants of 0.3 micron and larger) is necessary to ensure that the head-disc interface remains unencumbered and damage free. The slightest damage to the surface of a disc or read/write head can result in a catastrophic failure of the disc drive. The primary causes of catastrophic failure, particularly read/write head crashes (a nonrecoverable, catastrophic failure of the disc drive), are generally characterized as contamination, exposure to mechanically induced shock and non-shock induced damage. The source of non-shock induced damage is typically traced to the assembly process, and generally stems from handling damage sustained by the disc drive during the assembly process.

Several factors that bear particularly on the problem of assembly process induced damage are the physical size of the disc drive, the spacing of the components, the recording densities sought to be achieved and the level of precision to be maintained during the assembly process. The high levels of precision required by the assembly process are necessary to attain the operational tolerances required by the disc drive. The rigorous operational tolerances are in response to market demands that have driven the need to decrease the physical size of disc drives while simultaneously increasing disc drive storage capacity and performance characteristics.

Demands on disc drive mechanical components and assembly procedures have become increasingly more critical in order to meet the strenuous requirements of increased capability and size reduction in the face of these new market demands. Part-to-part variations in critical functional attributes in the magnitude of micro-inches can result in disc drive failures. Additionally, as disc drive designs continue to require size reduction, smaller read/write heads, thinner substrates, longer and thinner actuator arms, and thinner gimbal assemblies must continue to be incorporated into the drives. This trend significantly exacerbates the need to improve assembly processes to protect the read/write heads and discs from damage resulting from incidental contact between mating components. The aforementioned factors resultantly increase the difficulty of assembling disc drives, and as the assembly process becomes more difficult, the need to invent new tools, methods and control systems to deal with the emerging complexities pose unique problems in need of solutions.

Coupled with the size and performance demands is the further market driven requirement for ever increasing fault-free performance. The progression of continually thinner disc thickness and tighter disc spacing, together with increasing track density and increasing numbers of discs in the disc pack, has resulted in a demand for tools, methods and control systems of ever increasing sophistication. A result has been a decreasing number of assembly tasks involving direct operator intervention. Many of the tasks involved in modern methods are beyond the capability of operators to reliably and repeatedly perform, further driving the need for automated equipment and tooling.

In addition to the difficulties faced in assembling modern disc drives of high capacity and complex, physical product performance requirements have dictated the need to develop new process technologies to ensure compliance with operating specifications. The primary factors driving more stringent demands on the mechanical components and the assembly process are the continually increasing areal densities and data transfer rates of the disc drives.

The continuing trend in the disc drive industry is to develop products with ever increasing areal densities, decreasing, access times and increasing rotational speeds.

The combination of these factors places greater demands on the ability of modern servo systems to control the position of read/write heads relative to data tracks. The ability to assemble HDAs nominally free from the effects caused by unequal load forces on the read/write heads, disc pack imbalance or one of the components of runout, velocity and acceleration (commonly referred to as RVA) poses a significant challenge as track densities increase. The components of RVA are disc runout (a measure of the motion of the disc along the longitudinal axis of the motor as it rotates); velocity (a measure of variations in linear speed of the disc pack across the surface of the disc); and acceleration (a measure of the relative flatness of the discs in the disc pack). By design, a disc drive typically has a discrete threshold level of resistance to withstand rotationally induced noise and instability, below which the servo system is not impaired. Also, a fixed range of load forces must be maintained on the read/write head to ensure proper fly height for data exchange. The operating performance of the disc drive servo system is affected by mechanical factors beyond the effects of mechanically induced read/write head oscillation from disc surface anomalies. Errors are traceable to disc pack imbalance and RVA noise sources. Even with improved approaches to the veneration of position error signals in the disc drive servo system, the ability of the system to deal with such issues is finite. The limits of the servo system capability to reliably control the position of the read/write head relative to the data track must not be consumed by the noise present in the HDA resulting from the assembly process. Consumption of the available margin by the assembly process leaves no margin in the system to accommodate changes in the disc drive attributes over the life of the product. An inability to accommodate changes in the disc drive attributes leads to field failures and an overall loss in product reliability, a detrimental impact to product market position.

Taken in combination the above discussed factors—the tasks involved in assembling a modern disc drive exceeds the capability of manual assemblers; the susceptibility of the disc drive to damage during the assembly process; the level of precision assembly required by increasing areal densities; and the need to minimize adverse effects of mechanically induced noise on the disc drive servo system—have culminated to render prior disc drive assembly method archaic. Thus, in general, there is a need for an improved approach to disc drive assembling technology to minimize the potential of damage during assembly, to produce product that is design compliant and reliable, and to minimize mechanically induced system noise. More particularly, there is a need for a top cover installation station for installation of a top cover on a disc drive.

SUMMARY OF THE INVENTION

The present invention provides a top cover installation station with a feeder assembly and a robotic assembly for installing a top cover onto a basedeck of a disc drive by top cover fasteners. The feeder assembly supports several top cover wireframe caddies containing covers, and an escapement assembly for removing the top covers from the caddie. The escapement assembly includes a linear positioning assembly that supports and transports a rotary actuator that has a locating pin for registering the top cover to the rotary actuator prior to removal of the top cover from the top cover wireframe caddy, and the rotary actuator rotates the top cover for directional consistency with the disc drive. An elevator assembly of the feeder assembly lowers the top cover wireframe caddy until the first available top cover is disposed on a rotary actuator assembly. With the top cover secured on the rotary actuator assembly, the linear positioning assembly positions the top cover in a cover pick-up position for pick-up by the robotic assembly.

The robotic assembly has an X-Y-axis positioning assembly supporting Z-axis end effector assemblies, the positioning assembly transports the effector assemblies to predetermined positions. A first end effector assembly picks and places the top cover adjacent the basedeck, the second end effector assembly grips and secures the top cover onto the basedeck via the top cover fasteners.

BRIEF DESCRIPTION OF THE DRAWINGS

FIG. 6 is an exploded perspective view of a second independently operating Z-axis end effector assembly of FIG. 4.

DETAILED DESCRIPTION

Figure 1:
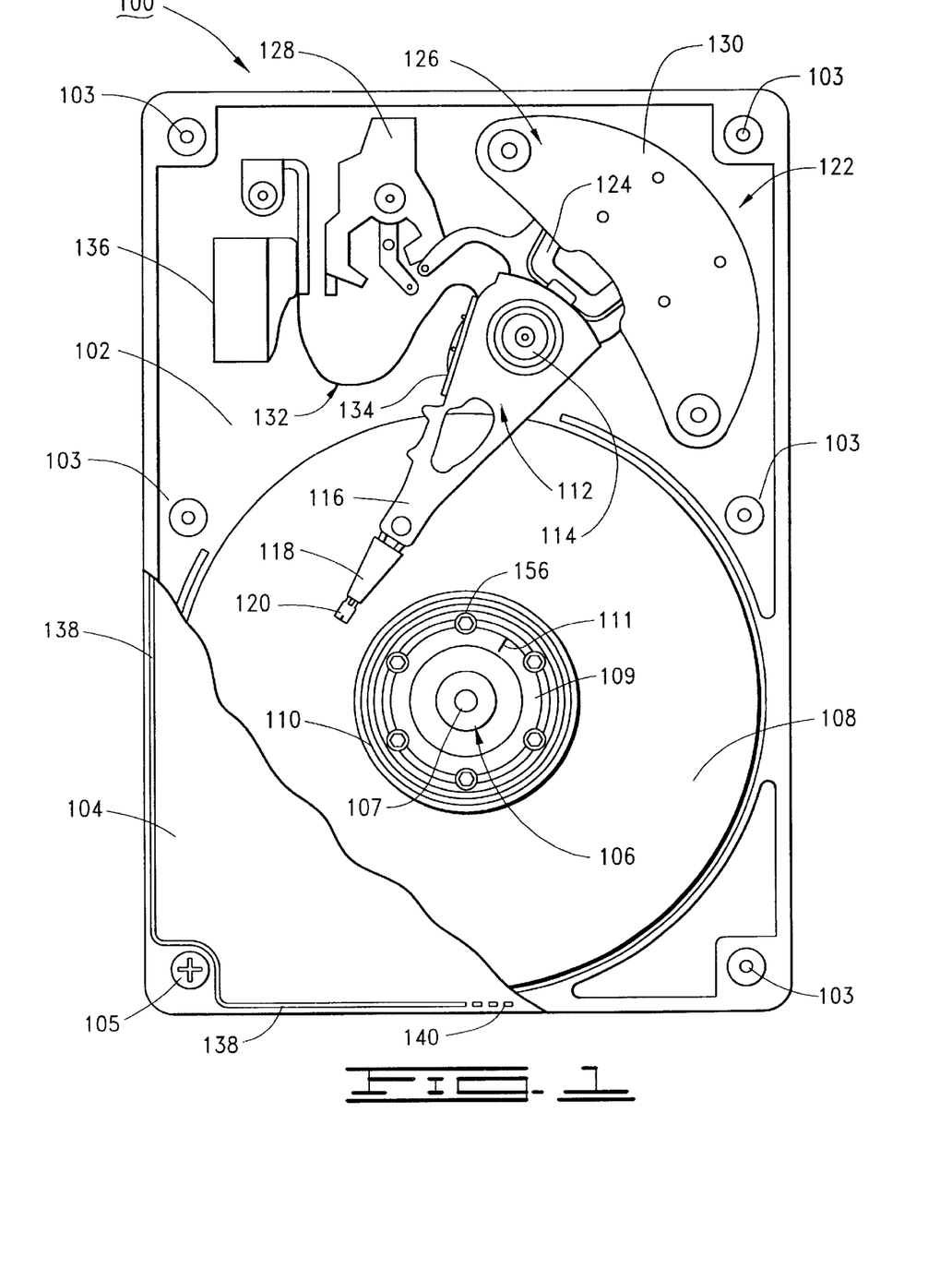
FIG. 1 is a top, partially cutaway view of a disc drive having a top cover assembled by a top cover installation station constructed in accordance with the present invention.

Referring to the drawings in general, and more particularly to FIG. 1, shown therein is a top view of a disc drive 100 constructed in accordance with the present invention. The disc drive 100 includes a basedeck 102 that has several fastener receptacles 103, the basedeck 102 supporting various disc drive components, and a top cover 104 (shown in part), with several mounting apertures 113, secured to the basedeck 102 by top cover fasteners 105. The installed top cover 104 together with the basedeck 102 provides a sealed internal environment for the disc drive 100. Numerous details of construction of the disc drive 100 are not included in the following description as such are well known to those skilled in the art and are believed to be unnecessary for the purpose of describing the present invention.

Mounted to the basedeck 102 is a spindle motor 106 that has a top cover attachment aperture 107, the spindle motor supports several discs 108 mounted on a spindle motor hub 109 that are secured by a clampring 110 for rotation at a constant high speed. In addition to providing support for the stacked discs 108, the spindle motor hub 109 also provides a timing mark 111 used during the assembly process to reference the angular location of a source of rotational imbalance. Adjacent the discs 108 is an actuator assembly 112 (also referred to as an "E-block") which, pivots about a cartridge bearing 114 in a rotary fashion. The actuator assembly 112 includes actuator arms 116 (only one shown) that support load arms 118. Each load arm 118 in turn supports read/write heads 120, with each of the read/write heads 120 corresponding to a surface of one of the discs 108. As mentioned, each of the discs 108 has a data recording surface divided into concentric circular data tracks, and the read/write heads 120 are positionably located over data tracks to read data from, or write data to, the tracks.

The actuator assembly 112 is controllably positioned by a voice coil motor assembly (VCM) 122, comprising an actuator coil 124 immersed in the magnetic field generated by a magnet assembly 126. A latch assembly 128 latches the actuator assembly in a predetermined park position when the disc drive 100 is turned off. A magnetically permeable flux path is provided by a steel plate 130 (also called a pole piece) is mounted above the actuator coil 124 to complete the magnetic circuit of the VCM 122.

When controlled DC current is passed through the actuator coil 124, an electromagnetic field is set up which, interacts with the magnetic circuit of the VCM 122 to cause the actuator coil 124 to move relative to the magnet assembly 126 in accordance with the well-known Lorentz relationship. As the actuator coil 124 moves, the actuator assembly 112 pivots about the cartridge bearing assembly 114, causing the heads 120 to move over the surfaces of the discs 108 thereby allowing the heads 120 to interact with the data tracks of the discs 108.

To provide the requisite electrical conduction paths between the heads 120 and disc drive read/write circuitry (not shown), read/write head wires (not separately shown) are routed on the actuator assembly 112 from the heads 120 along the load arms 118 and the actuator arms 116 to a flex circuit 132. The read/write head wires are secured to corresponding pads of a flex circuit printed circuit board (PCB) 134 of the flex circuit 132. The flex circuit 132 is connected to a flex circuit bracket 136 in a conventional manner, which in turn is connected through the basedeck 102 to a disc drive PCB (not shown) mounted to the underside of the basedeck 102. The disc drive PCB provides the disc drive read/write circuitry which, controls the operation of the heads 120, as well as other interface and control circuitry for the disc drive 100.

To maintain the sealed internal environment for the disc drive 100, a seal gasket 138 is molded on to the top cover 104. Top cover 104 has a plurality of gasket attachment apertures 140 through which gasket material flows during the gasket molding process. A continuum of symmetrically formed gasket material is disposed on both the top and bottom surfaces of the top cover 104 and injected through the apertures 140. During the cure process, the gasket material injected into the gasket attachment apertures 140 bonds the portion of the seal gasket adjacent the top surface of the top cover to the portion of the seal gasket adjacent the bottom portion of the top cover 104, thereby sealing the gasket attachment apertures 140 and forming the seal gasket 138. A gasket material found to be useful for this application is "Fluorel" by the 3M company, and more specifically, 3M "Fluorel", FE-5621Q.

Figure 2:
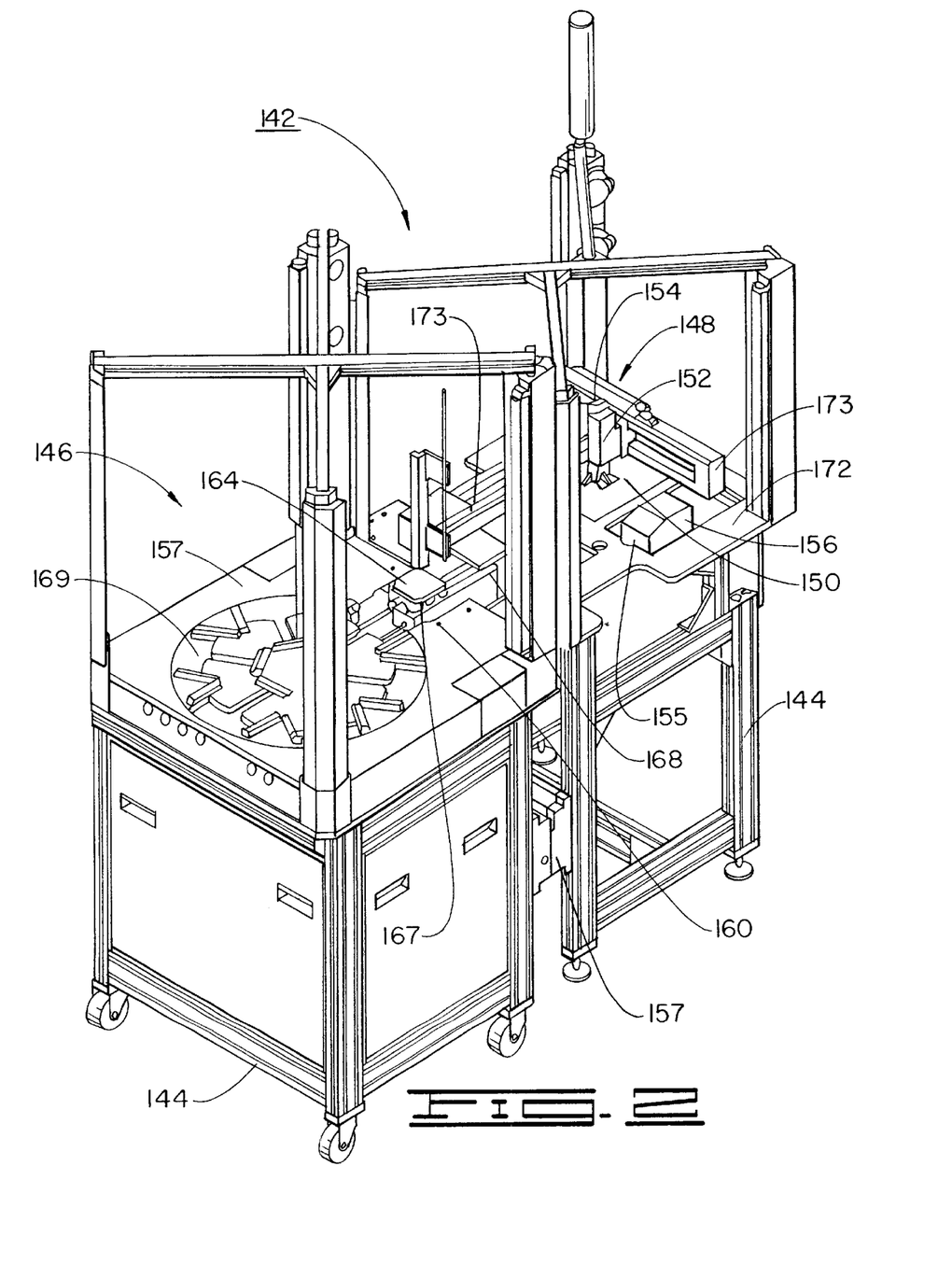
FIG. 2 is a perspective view of the top cover installation station for installing the top cover on the disc drive of FIG. 1.

FIG. 2 shows a top cover installation station 142 that installs the top cover 104 of the disc drive 100 on the basedeck 102 by securing the top cover fasteners 105 through mounting apertures 113 of the top cover 104 into the fastener receptacles 103 of the basedeck 102, and into the top cover attachment aperture 107 of the spindle motor 106. A frame 144 supports two primary assemblies, a feeder assembly 146 and a robotic assembly 148. The feeder assembly 146 prepositions the top cover 104 for pick-up by the robotic assembly 148, prior to the robotic assembly 148 picking and placing the top cover 104 on the basedeck 102. A pair of effector assemblies 150, supported by the frame 144, cooperate independently to position the top cover 104 into the basedeck 102 and secure the top cover fasteners 105 on the basedeck 102. The first of the pair of end effector assemblies 150 is a top cover Z-axis end effector assembly 152 that grasps then positions the top cover 104 on the basedeck 102. The second of the pair of end effector assemblies 150 is a fastener driving Z-axis in effector assembly 154 grips and removes the top cover fasteners 105 from a fastener pick-up position 155 of a fastener feeder assembly 156 and secures the top cover fasteners 105 into the basedeck 102 to secure the top cover 104 on the basedeck 102 to form the disc drive 100.

Docking bracket 157 joins the feeder assembly 146 to the robotic assembly 148 for installation of the top cover installation station 142 into an automated disc drive assembly line (not shown). By positioning a conveyor (not shown) through the robotic assembly 148 and then rolling the feeder assembly 146, with the docking bracket 157, into position the robotic assembly 148 joins the feeder assembly 148 to form the top cover installation 142. For maintenance operations the docking bracket 157 separates the feeder assembly 146 from the robotic assembly 148.

In operation, the robotic assembly 148 interacts with the feeder assembly 142 to pick and place the top cover 104 on the basedeck 102 then secures the top cover fasteners 105 into the fastener receptacles 103 of the basedeck 102 and the top cover attachment aperture 107 of the spindle motor 106. To accomplish the operational steps of the top cover installation station 142, the top cover Z-axis end effector 152 grasps and aligns the top cover 104. At the same time, the fastener driving, Z-axis end effector assembly 154 grips, positions, and secures each top cover fastener 105 through the mountings apertures 113 of the top cover 104. Some of the top cover fasteners 105 fit into fastener receptacles 103 of the base deck. Some of the top cover fasteners 105 fit into the top cover attachment aperture 107 in the spindle motor. All of the top cover fasteners operate to secure the top cover 104 to the basedeck 102 and to the spindle motor 106 to form the disc drive 100.

Figure 3:
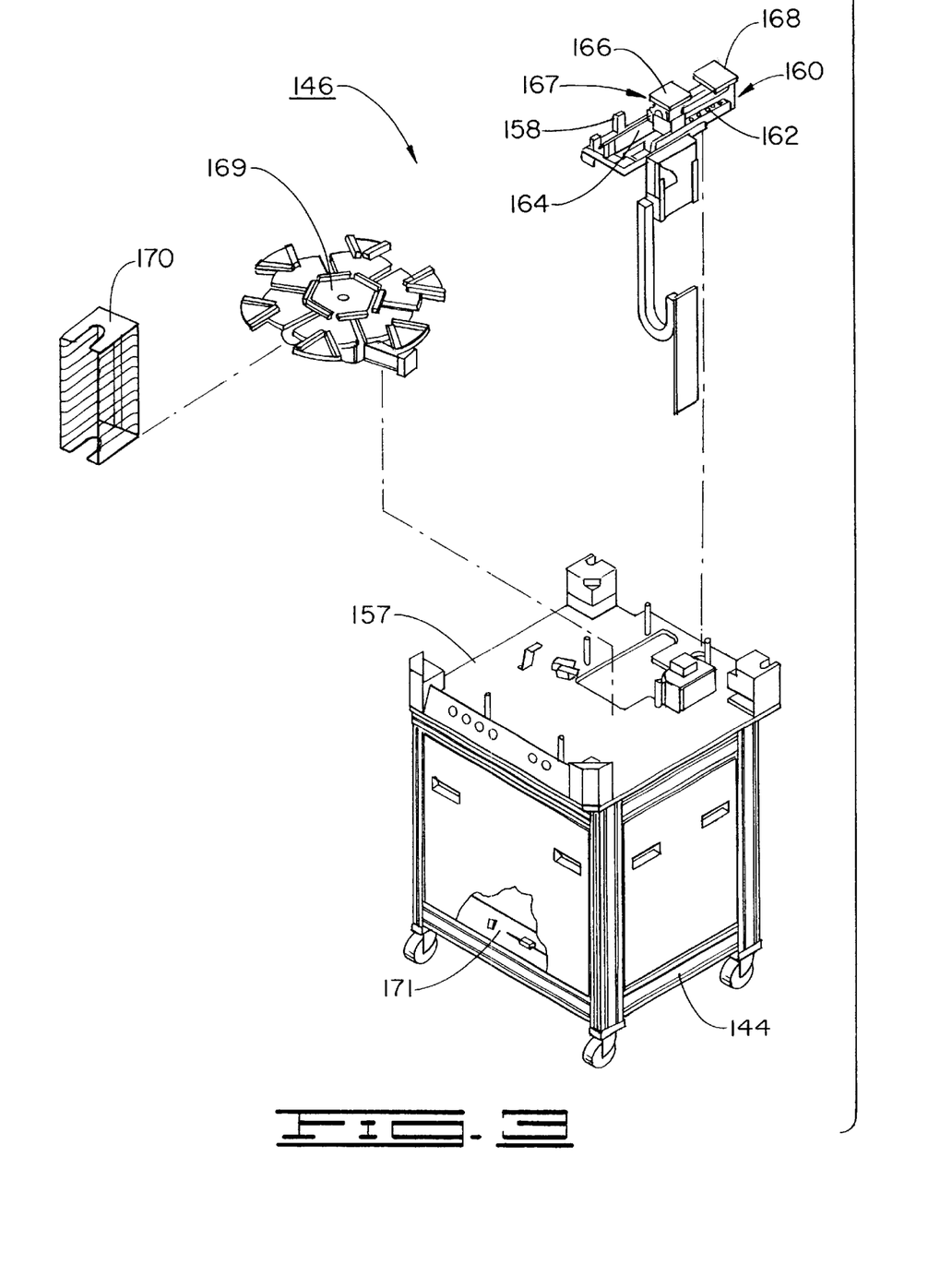
FIG. 3 is an exploded, partial cutaway, perspective view of the feeder assembly of the top cover installation station of FIG. 2.

FIG. 3 shows the frame 144 supporting a mounting plate 157 of the feeder assembly 146 of FIG. 2, which supports an elevator assembly 158. The elevator assembly 158 positions the top cover 104 for pick up by an escapement assembly 160. The escapement assembly 160 is supported by the elevator assembly 158 and includes a linear positioning assembly 162 and a rotary action 164. The rotary actuator assembly has several locating pins 166 (one shown) that cooperate with the mounting apertures 113 of the top cover 104. The locating pins 166 register a position of the top cover 104 relative to the rotary actuator 164. In operation, the linear positioning assembly 162 shuttles the rotary actuator assembly 164 into a first position 167 for receiving the top cover 104 and then into a cover pick-up position 168 (shown in outline form) for delivering the top cover 104 for pick-up by the robotic assembly 148 of FIG. 2.

The mounting plate 157 supports a dial assembly 169 that supports several top cover wireframe caddies 170. Each top cover wireframe caddy 170 carries several top covers 104 for installation on the basedeck 102. The dial assembly 169 indexes the top cover caddy 170 into alignment with the elevator 158 to dispense the top covers 104 from the top cover caddy 170. The linear positioning, assembly 162 shuttles the rotary actuator 164 into alignment with the top cover beneath the wireframe caddy 170 to position the rotary actuator 164 for receipt of the top cover 104. The elevator assembly 158 lowers top cover wireframe caddy 170 until the mounting apertures 113 of the top cover 104 are disposed on the locating pins 166. The linear positioning assembly 162 extracts the top cover 104 from the top cover caddy 170 and rotates the top cover 104 to be directionally consistent with the basedeck 102. After rotating the top cover 104, the rotary actuator 164 positions the top cover 104 in the cover pick-up position 168 for pick-up by the robotic assembly 148. Additionally, the frame 144 further supports a station computer 171 that manages the operations of the automated top cover installation station 142.

Figure 4:
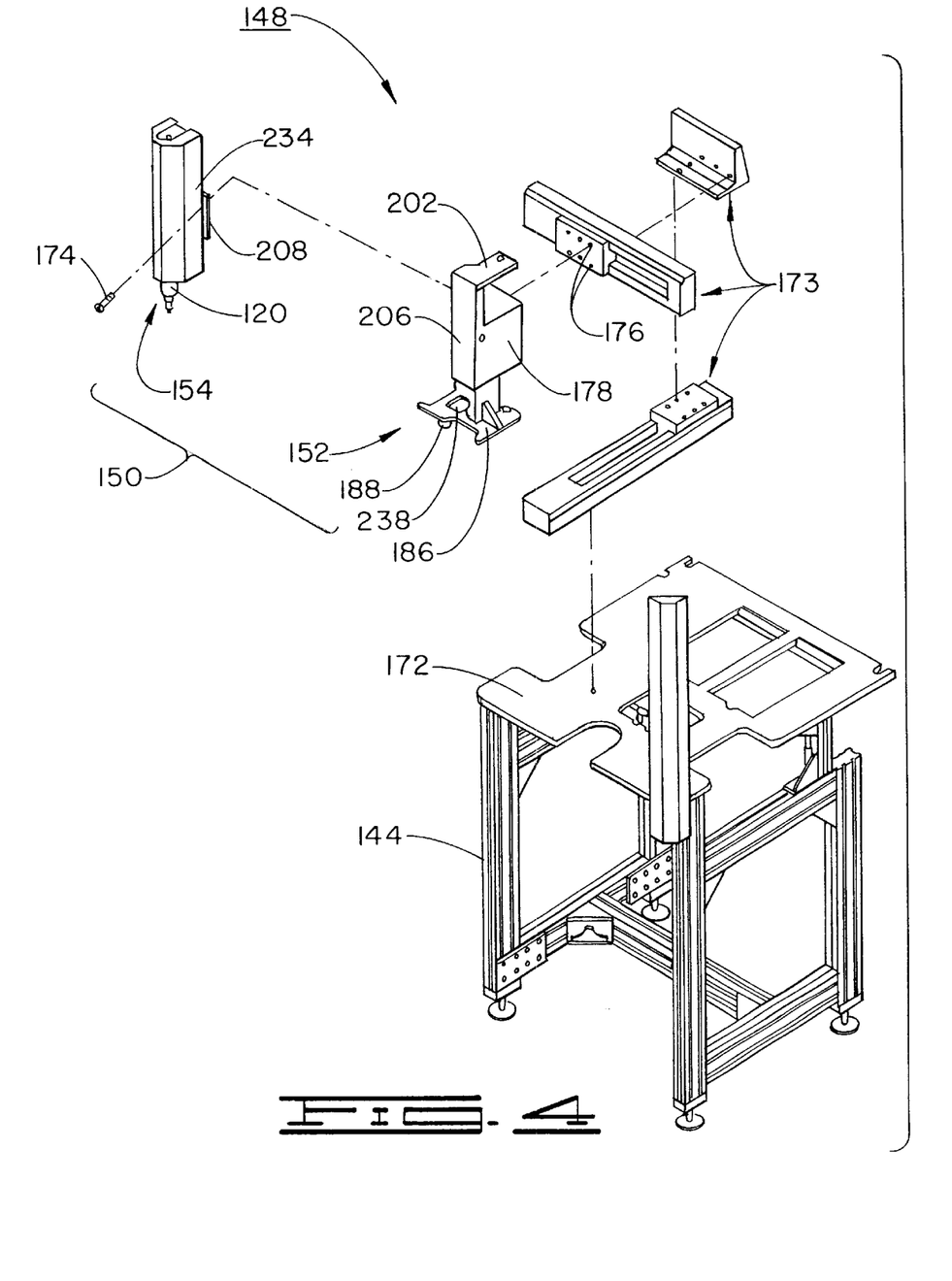
FIG. 4 is an exploded, perspective view of the robotic assembly of the top cover installation station of FIG. 2.

FIG. 4 shows the frame 144 cooperating with the support plate 172 that supports an X-Y-axis positioning assembly 173. The X-Y-axis positioning, assembly 173 supports the pair of end effector assemblies 150 and provides the X-Y-axis positioning requirements for the top cover installation station 142. Four attachment fasteners 174 (one shown) secure the pair of end effector assemblies 150 to the X-Y-axis positioning assembly 173 by engaging the threaded attachment apertures 176. A lift and locate assembly 175 secures the basedeck 102 within the top cover installation station 142 during the top cover 104 installation process.

In operation, the X-Y-axis positioning assembly 173 positions the pair of end effector assemblies 150 to pick up top cover fasteners 105 from the fastener pick-up position 155 of the fastener feeder assembly 156. When positioned, the fastener driving Z-axis end effector assembly 154 travels downward in the Z direction to engrage the top cover fastener 105, grips the top cover fastener 105 and returns to a home position. With the top cover fasteners 105 gripped by the fastener driving Z-axis end effector assembly 154, the X-Y-axis positioning assembly 173 transports the pair of end effector assemblies 150 into alignment with the top cover 104 disposed on the rotary actuator 164 of the escapement assembly 160 of FIG. 3 and positioned in the cover pick-up position 168. When aligned, the top cover Z-axis end effector assembly 152 travels downvward in the Z direction to engage the top cover 104, then grasps the top cover 104 and returns to a home position. With the top cover 104 grasped by the top cover Z-axis end effector assembly 152, the X-Y-axis positioning assembly 173 transports the pair of end effector assemblies 150 into alignment with the basedeck 102. When positioned, the top cover Z-axis end effector 152 travels downward in the Z direction to place and hold the top cover 104 adjacent the basedeck 102.

Figure 5:
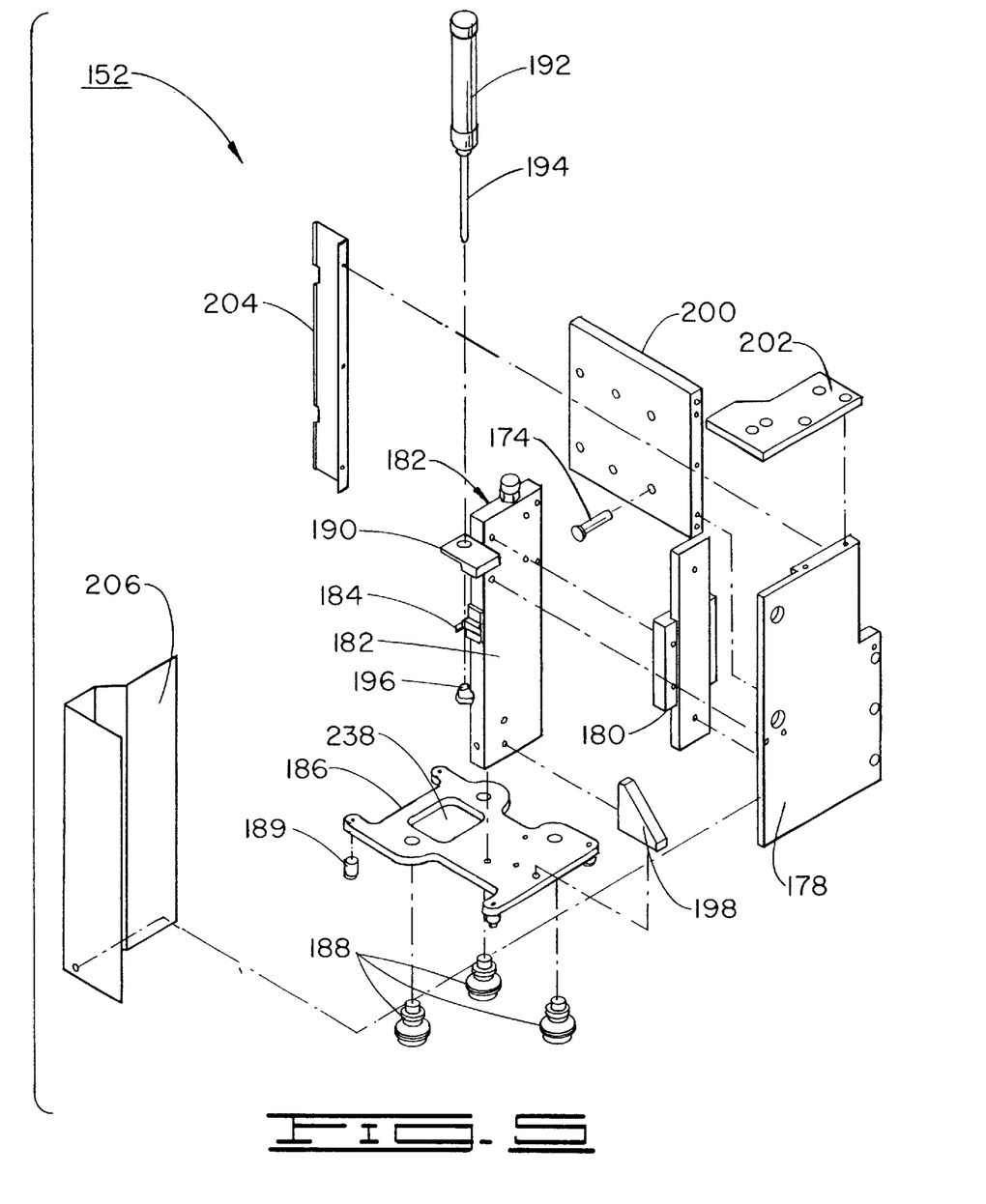
FIG. 5 is an exploded perspective view of a first independently operating Z-axis end effector assembly of FIG. 4.

FIG. 5 shows the top cover Z-axis end effector assembly 152 of FIG. 4. A baseplate 178 supports a linear slide assembly 180. the linear slide assembly 180 permits travel in the Z direction for the end effector assembly 152. The linear slide assembly 180 supports a left plate 182 that has a lift bracket 184 and a pick-up plate 186 with suction cups 188 and end effector standoffs 189. The left plate 182 registers the pick-up plate 186 adjacent the top cover 104 and, under vacuum, the suction cups 188 grasp the top cover 104. Additionally, the baseplate 178 supports a cylinder mount 190 that supports a first air cylinder 192 that has a positioning rod 194. The first air cylinder 192 provides an instrumentality for vertical travel in the Z direction of the top cover Z-axis end effector assembly 152. The cylinder mount 190 maintains the body of the first air cylinder 192 stationary in relation to the baseplate 178. A first jam nut 196 attaches the positioning rod 194 to the lift bracket 184. The positioning rod 194 travels in the Z direction, under air pressure, in response to the control computer 171 to either lower or raise the pick-up plate 186. The suction cups 188 are protected by end effector standoffs 189 (one shown) against being overdriven by the first air cylinder 192. The end effector standoffs 189 also serve to constrain the top cover 104 against the basedeck 102 during the attachment of the top cover fasteners 105 to the basedeck 102 and the spindle motor 106.

An end effector support gusset 198 provides structural support between the pick-up plate 186 and the lift plate 182 to assure consistent and repeatable performance by the top cover Z-axis end effector assembly 152 during operation of the top cover installation station 142. The baseplate 178 also supports a mounting plate 200 that provides mounting ports 201 for the attachment fasteners 174 to pass when securing the top cover Z-axis end effector assembly 152 to the X-Y-axis positioning assembly 173. And finally the baseplate 178 supports a top cover plate 202, a rear cover plate 204 and a front cover plate 206. Collectively, the top cover plate 202, the rear cover plate 204 in the front cover plate 206, in conjunction with the pick-up plate 186, provide a confinement chamber and an exodus path for particulate generated by the top cover Z-axis end effector assembly 152 during the operation of the top cover installation station 142.

FIG. 6 shows the fastener driving Z-axis end effector assembly 154 of FIG. 4. The attachment fasteners 174 of FIG. 5 secure the fastener driving Z-axis end effector assembly 154 to be X-Y-axis positioning assembly 173, by passing through mounting holes 208 provided by a dovetail adapter plate 210. To secure the pair of end effector assemblies 150 to the X-Y-axis positioning assembly 173. the attachment fasteners 174 of FIG. 5 sequentially pass through the mounting holes 208 of the fastener driving Z-axis end effector assembly 154, then through the mounting ports 212 of the top cover Z-axis end effector assembly 152 prior to engaging the threaded attachment apertures 176 of the X-Y-axis positioning assembly 173 of FIG. 4. The dovetail adapter 210 cooperates with a Z-axis positioning plate 212 to facilitate motion in the Z direction for the fastener driving Z-axis end effector assembly 154. The Z-axis positioning plate 212 supports a linear bearing 214 that has a screwdriver mounting block 216 supporting a screwdriver attachment assembly 218 with power screwdriver 220. The linear hearing 214 assures freedom of travel of the fastener driving Z-axis end effector assembly 154 during the operation of the top cover installation station 142. In addition to supporting a screwdriver attachment assembly 218, the screwdriver mounting block 216 rides on a linear bearing 214 to maintain stability in orientation between the attachment assembly 218 and the Z-axis positioning plate 212. The screwdriver attachment assembly 218 constrains the power screwdriver 220 and prevents shifts in the orientation of power screwdriver 220 during the operation of the top cover installation station 142.

In operation, the power screwdriver 220 grips and then secures the top cover fasteners 105 by first passing the top cover fastener 105 through the mounting apertures 113 of the top cover 104, then into the top cover attachment aperture 107 of the spindle motor 106 and into the fastener receptacles 103 of the basedeck 102 of FIG. 1. The linear bearing 214 also supports an air cylinder mounting block 222 with an air cylinder amount 224 supporting is a second air cylinder 226 that has a positioning shaft 228. The positioning shaft 228 is secured to the screwdriver attachment assembly 218 by a second jam nut 230, the positioning shaft 228 operates under air pressure applied to the second air cylinder 226 by raising or lowering the power screwdriver 220 when activated by the station computer 171. The air cylinder mounting block 222 remains stationery relative to the linear bearing 214 to capture the body of the second air cylinder 226, allowing the positioning shaft 228 to operate freely. An exhaust port assembly 232 and a cover 234 co-operate to remove particulate generated by the fastener driving Z-axis end effector assembly 154 during the operation of the top cover installation station 142.

Figure 7:
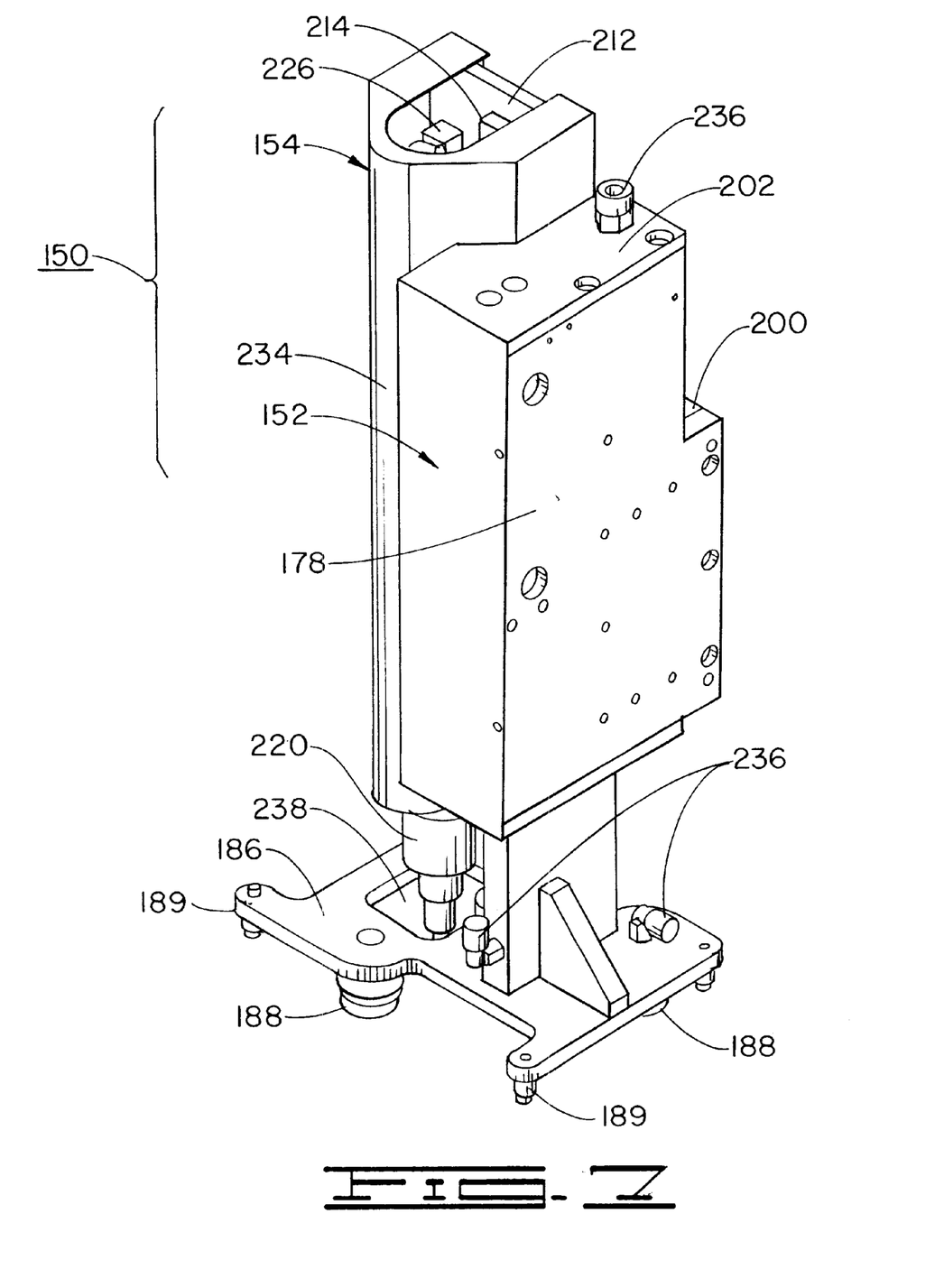
FIG. 7 is a perspective view of a pair of independently operating Z-axis end effector assemblies formed by combining the first independently operating Z-axis end effector assembly of FIG. 4 with the second independently operating Z-axis end effector assembly of FIG. 4.

FIG. 7 shows the pair of end effector assemblies 150 with the top cover Z-axis end effector assembly 152 aligned with the fastener driving Z-axis end effector assembly 154 for cooperating independent functioning needed by the top cover installation station 142 to install the top cover 104 with the top cover fasteners 105 onto the basedeck 102 to form the disc drive 100 of FIG. 1. Exhaust ports 236 operate under a vacuum pressure to expel particulate generated by the pair of end effector assemblies 150 during operation of the automated disc drive assembly 142. The vacuum pressure also enables suction cups 188 to grasp the top cover 104 and the powered screwdriver 220 to grip the top cover fasteners 105. A screwdriver access port 238, provided by the pick-up plate 186, accommodates unencumbered Z-axis travel by the power screwdriver 220 during active operation of the fastener driving Z-axis end effector assembly 154 and further accommodates the independent Z-axis travel of both the fastener driving Z-axis end effector assembly 154 and the top cover Z-axis end effector assembly 152.

The present invention provides a top cover installation station (such as 142) with a feeder assembly (such as 146) and a robotic assembly (such as 148) for installing a top cover (such as 104) with top cover fasteners (such as 105) on a basedeck (such as 102) of a disc drive (such as 100). The feeder assembly supports top cover wireframe caddies (such as 170), each caddy containing top covers. A dial assembly (such as 169) transports each caddy into alignment with an elevator assembly (such as 158) that aligns the top cover with an escapement assembly (such as 160) that removes the top cover from the caddy. The robotic assembly has an X-Y-axis positioning assembly (such as 173) supporting a pair of Z-axis end effector assemblies (such as 150), the positioning assembly transporting the pair of effector assemblies to predetermine points. A first end effector assembly (such as 152) picks and places the top cover adjacent the basedeck and a second end effector assembly (such as 154) grips and secures each top cover fastener through each mounting aperture (such as 113) and into each fastener receptacle (such as 103) of the basedeck.

It is clear that the present invention is well adapted to attain the ends and advantages mentioned as well as those inherent therein. While a presently preferred embodiment of the invention has been described for purposes of the disclosure, it will be understood that numerous changes can be made which will readily suggest themselves to those skilled in the art. Such changes are encompassed within the spirit of the invention disclosed and as defined in the appended claims.

What is claimed is:

1. A top cover installation station for installing a top cover with top cover fasteners on a basedeck of a disc drive, the top cover installation station comprising:
   a frame;
   a cover feeder assembly supported by the frame presenting the top cover to a cover pick-up position;
   a fastener feeder assembly supported by the frame presenting the top cover fasteners to a fastener pick-up position;
   a robotic assembly supported by the frame securing the top cover to the basedeck, the robotic assembly comprising:
      a first end effector assembly grasping the top cover positioned in the cover pick-up position and aligning the top cover adjacent the basedeck; and
      a second end effector assembly grasping the top cover fasteners positioned in the fastener pick-up position and securing the top cover to the basedeck with the top cover fasteners.

2. The top cover installation station of claim 1 wherein the feeder assembly further comprises an elevator assembly and supports a plurality of top cover wireframe caddies supporting a plurality of top covers, each top cover wireframe caddy communicating with the elevator assembly to position the top cover prior to removal of the top cover from the top cover wireframe caddy.

3. The top cover installation station of claim 2 wherein the feeder assembly further comprises an escapement assembly with a linear positioning assembly supporting a rotary actuator, the escapement assembly interacting with the elevator assembly to remove the top cover from the top cover wireframe caddy, the elevator assembly lowering the top cover on to the rotary actuator, the linear positioning assembly extracting the top cover from the top cover wireframe caddy, the rotary actuator rotating the top cover for pick-up by the robotic assembly.

4. The top cover installation station of claim 3 wherein the feeder assembly further comprises a dial assembly, the dial assembly transporting each top cover wireframe caddy into alignment with the elevator assembly, and wherein the elevator assembly disposes the top cover on the top cover rotary actuator, the elevator assembly returning the top cover wireframe caddy to the dial assembly upon extraction of all top covers from the top cover wireframe caddy.

5. The top cover installation station of claim 4 wherein the robotic assembly further comprises an X-Y-axis positioning assembly and a plurality of attachment fasteners, the positioning assembly providing threaded attachment apertures, wherein the attachment fasteners engage the threaded attachment apertures to secure the first end effector assembly and the second end effector assembly to the X-Y-axis positioning assembly, and wherein the X-Y-axis positioning assembly transports the first and second end effector assemblies to predetermined points during the operation of the top cover installation station.

6. The top cover installation station of claim 5 wherein the first end effector assembly is a top cover Z-axis end effector assembly comprising:
   a baseplate;
   a linear slide assembly supported by the baseplate and having a lift plate with a lift bracket and an attached pick-up plate having a plurality of suction cups, wherein the linear slide assembly positions the pick-up plate adjacent the top cover and wherein the suction cups grasp the top cover;
   a cylinder mount supported by the baseplate and supporting a first air cylinder with a positioning rod, the first air cylinder positioning rod connected to the lift bracket, the first air cylinder providing the force needed to effectuate vertical travel of the end effector;
   an end effector support gusset supported by the lift plate and contacting the top cover Z-axis end effector assembly, the end effector support gusset provide structural supported between the pick-up plate and the lift plate in the attached top cover Z-axis end effector assembly and
   a mountings plate supported by the baseplate and adjacent the positioning assembly, the mounting plate providing attachment holes for passage of the attachment fasteners to secure the top cover Z-axis end effector assembly to the positioning assembly.

7. The top cover installation station of claim 6 wherein the second end effector assembly is a fastener driving Z-axis end effector assembly comprising:

a dovetail adapter plate adjacent the mounting plate and providing mounting holes for passage of the attachment fasteners to secure the fastener driving Z-axis end effector assembly to the positioning assembly;

a Z-axis positioning plate cooperating with the dovetail adapter plate to position the fastener driving Z-axis end effector assembly and to support a linear hearing having a screwdriver mounting block supporting a screwdriver attachment assembly with a power screwdriver;

an air cylinder mounting block supported by the Z-axis positioning plate, wherein the air cylinder mounting block supports an air cylinder mount with a second air cylinder having a positioning shaft, the second air cylinder providing vertical travel to the power screwdriver, and wherein the power screwdriver secures the top cover fasteners into the disc drive; and a first jam nut connecting the positioning shaft of the second air cylinder to the air cylinder mount.

8. The top cover installation station of claim 7 wherein the disc drive comprises a disc pack with a top cover attachment aperture and wherein the disc drive is supported by a basedeck providing a plurality of fastener receptacles, and wherein the top cover attachment aperture and the fastener receptacles receive the top cover fasteners.

9. The top cover installation station of claim 8 wherein the top cover Z-axis end effector assembly and the fastener driving Z-axis end effector assembly share common attachment fasteners, wherein the pick-up plate provides a screwdriver access port to allow passage of the power screwdriver when securing the top cover fasteners, the centerline of the access port is aligned with the centerline of the electric screwdriver, wherein the top cover Z-axis end effector assembly and the fastener driving Z-axis end effector assembly travel in the Z-axis independently, and wherein the top cover Z-axis end effector assembly and the fastener driving Z-axis end effector assembly travel in the X-Y-axis simultaneously.

* * * * *

UNITED STATES PATENT AND TRADEMARK OFFICE
CERTIFICATE OF CORRECTION

PATENT NO.     : 6,497,036 B1
DATED          : December 24, 2002
INVENTOR(S)    : James R. Jenkins and Roger A. Jessen It is certified that error appears in the above-identified patent and that said Letters Patent is hereby corrected as shown below:

<u>Column 3,</u>
Line 24, replace "veneration" with -- generation --.

<u>Column 10,</u>
Line 57, replace "supported" with -- support --.

<u>Column 11,</u>
Line 7, replace "hearing" with -- bearing --.

Signed and Sealed this

Thirteenth Day of April, 2004

JON W. DUDAS
*Acting Director of the United States Patent and Trademark Office*